US012657131B1

(12) United States Patent
Chawla et al.

(10) Patent No.: US 12,657,131 B1
(45) Date of Patent: Jun. 16, 2026

(54) DISTRIBUTED LEASE TIME BASED CACHE EVICTION

(71) Applicant: Dell Products L.P., Round Rock, TX (US)

(72) Inventors: Rohit K Chawla, Scotch Plains, NJ (US); Neha R Naik, Fairview, PA (US); Viral Kirtikumar Mehta, Pune (IN); Dominick I Santangelo, Raleigh, NC (US); Gokul Prasanna Mani, Apex, NC (US)

(73) Assignee: Dell Products L.P., Round Rock, TX (US)

( * ) Notice: Subject to any disclaimer, the term of this patent is extended or adjusted under 35 U.S.C. 154(b) by 36 days.

(21) Appl. No.: 19/035,569

(22) Filed: Jan. 23, 2025

(51) Int. Cl.
*G06F 12/0891* (2016.01)

(52) U.S. Cl.
CPC .................................. *G06F 12/0891* (2013.01)

(58) Field of Classification Search
CPC .................................................... G06F 12/0891
See application file for complete search history.

(56) References Cited

U.S. PATENT DOCUMENTS

| | | | | | |
|---|---|---|---|---|---|
| 5,226,143 A | * | 7/1993 | Baird | .................. | G06F 12/0815 |
| | | | | | 711/147 |
| 5,909,540 A | * | 6/1999 | Carter | ................. | G06F 11/1435 |
| | | | | | 711/E12.066 |

| | | | | | |
|---|---|---|---|---|---|
| 2004/0202013 A1 | * | 10/2004 | Dove | ...................... | G06F 9/526 |
| | | | | | 365/154 |
| 2009/0037666 A1 | * | 2/2009 | Rahman | .............. | G06F 12/0846 |
| | | | | | 711/143 |
| 2019/0102297 A1 | * | 4/2019 | Jaskiewicz | .............. | G06F 16/00 |
| 2022/0197830 A1 | * | 6/2022 | Steinke | .............. | G06F 12/0802 |
| 2023/0342297 A1 | * | 10/2023 | Witham | .................... | G06F 9/52 |
| 2025/0336026 A1 | * | 10/2025 | Fries | ......................... | G06T 9/00 |

OTHER PUBLICATIONS

Santiago, Java Concurrency—lock() and tryLock(), Jan. 12, 2025, available at: https://medium.com/@barbieri.santiago/java-concurrency-lock-and-trylock-3eb6df12910a (Year: 2025).*

* cited by examiner

*Primary Examiner* — Ryan Bertram
(74) *Attorney, Agent, or Firm* — Chamberlain, Hrdlicka, White, Williams & Aughtry; Aly Z. Dossa

(57) ABSTRACT

A method for preventing cache element access in a cache. The method includes selecting a cache element represented in a global hash table, making a first determination that a shared trylock associated with the cache element can be obtained, obtaining the shared trylock based on the first determination and receiving a can inval flag; making a second determination that an exclusive trylock associated with the cache element can be obtained; obtaining the exclusive trylock based on the second determination, and invalidating, after obtaining the exclusive trylock, the cache element.

20 Claims, 8 Drawing Sheets

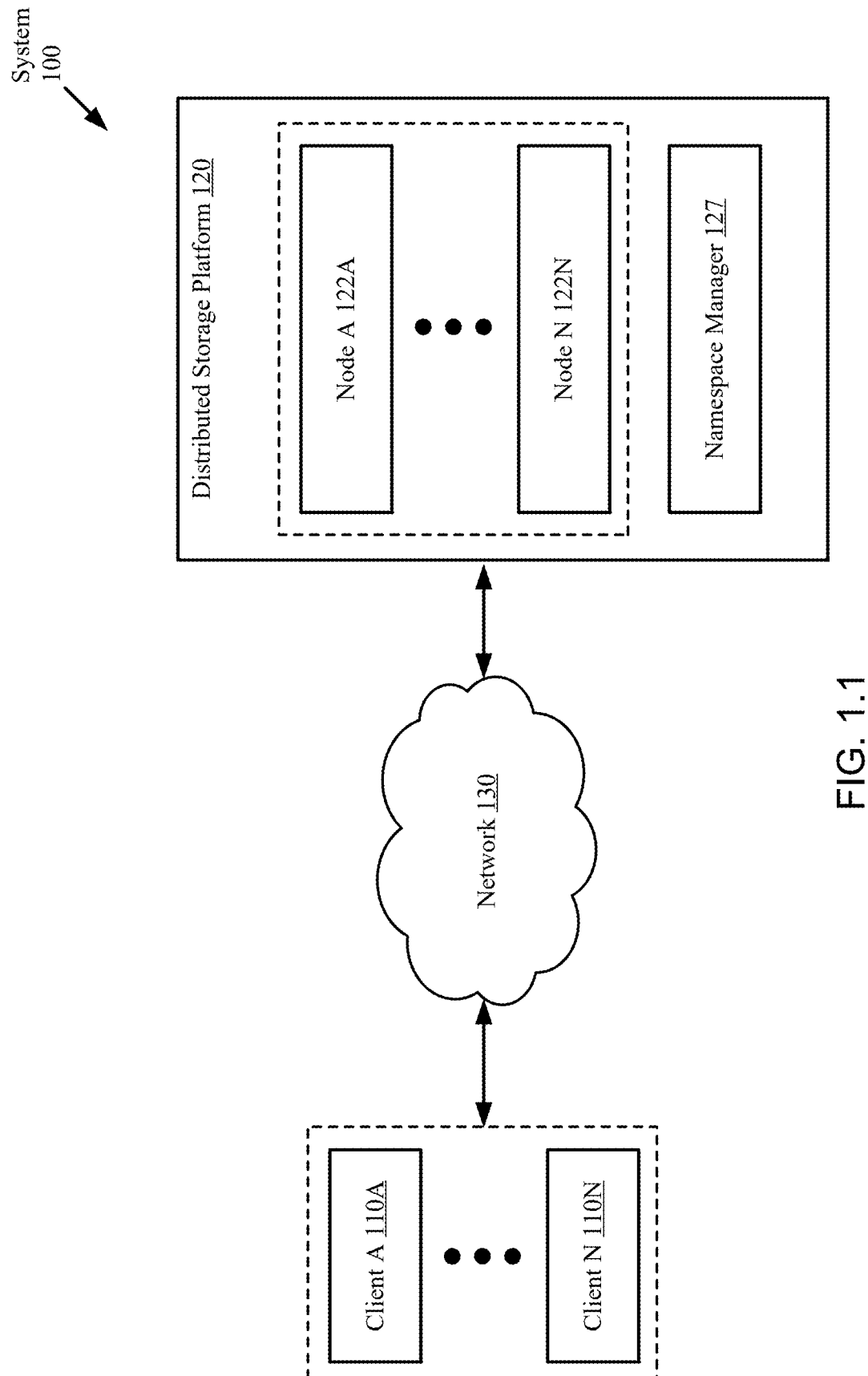
FIG. 1.1

Node
130
Cache
132
FIG. 1.2
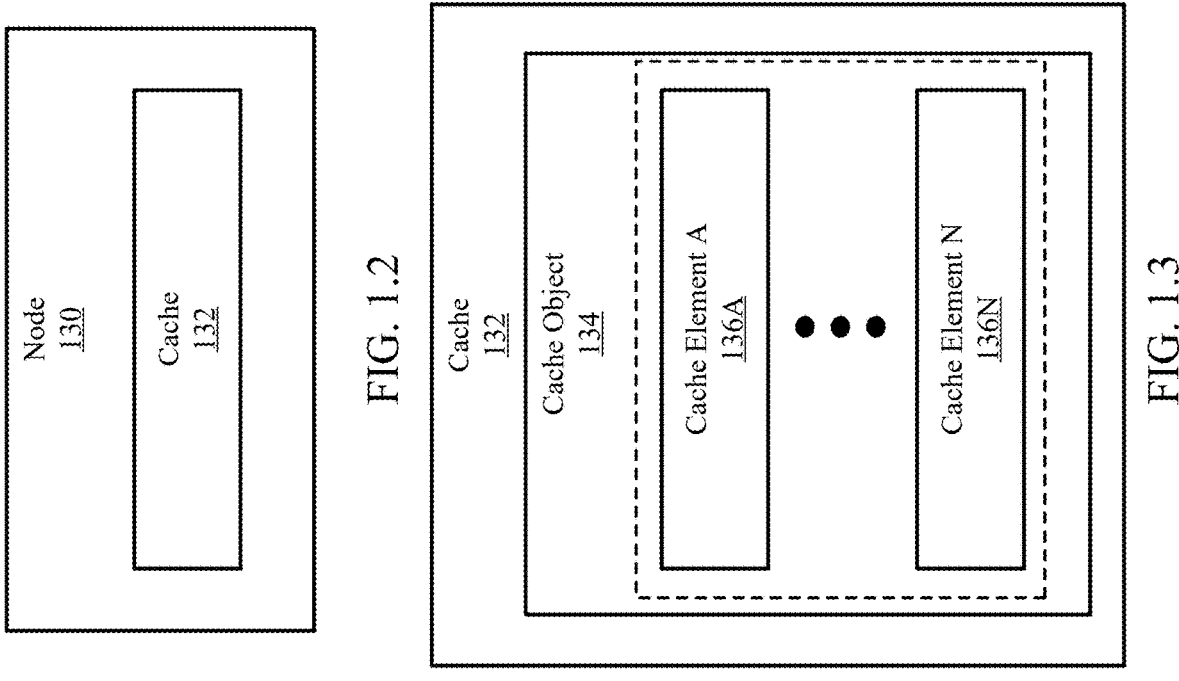
Cache
132
Cache Object
134
Cache Element A
136A
Cache Element N
136N
FIG. 1.3

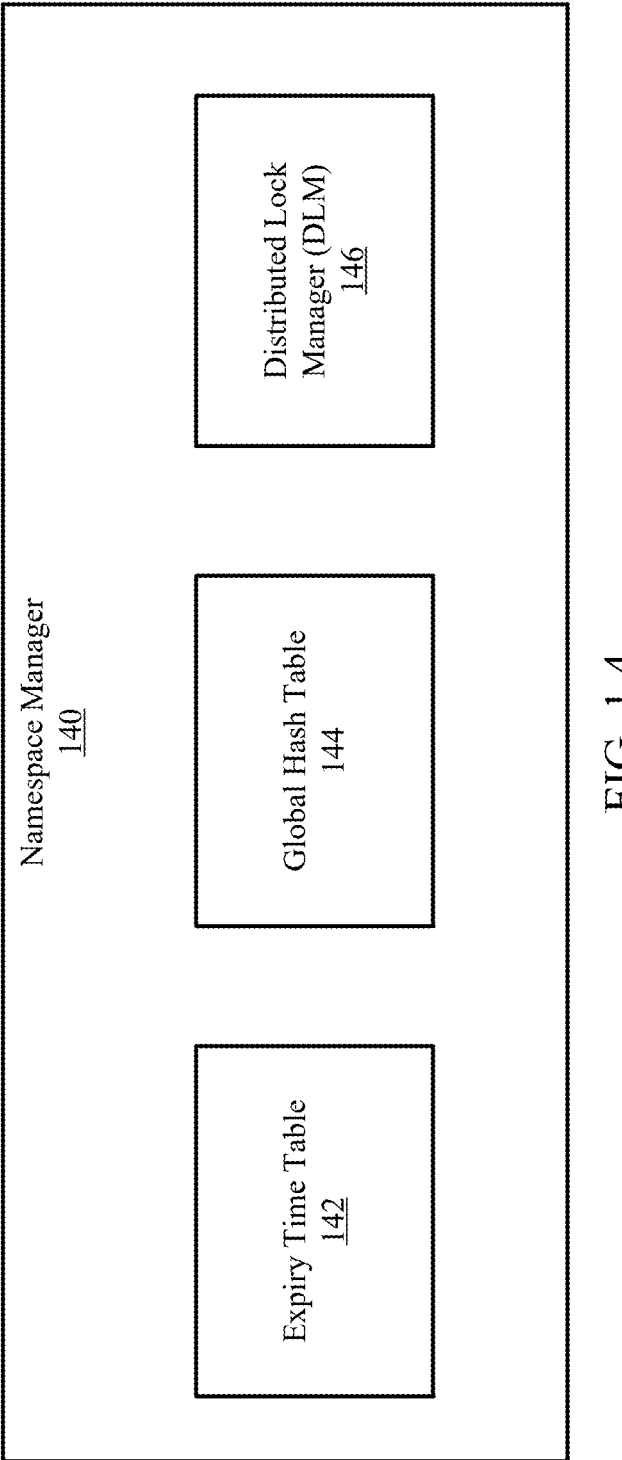
FIG. 1.4

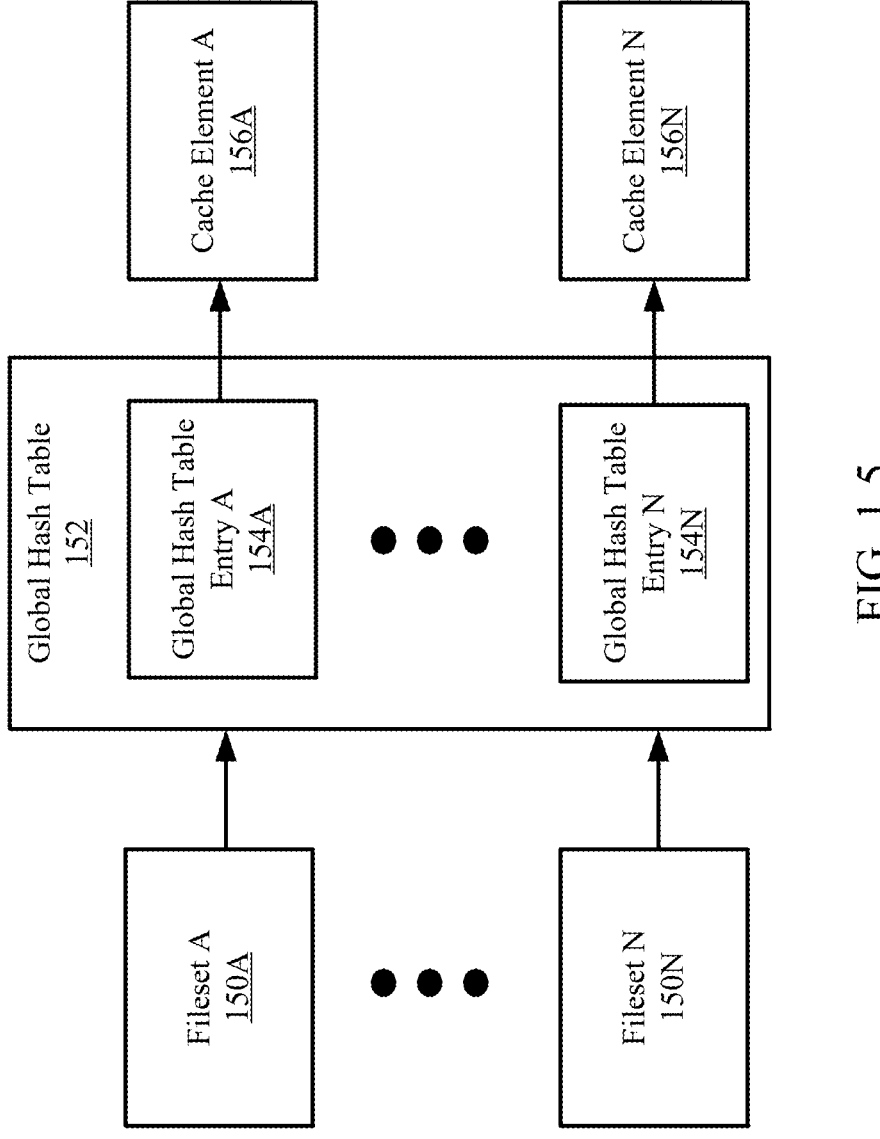
FIG. 1.5

DISTRIBUTED LEASE TIME BASED CACHE EVICTION

BACKGROUND

Devices consume significant resources to evict elements within a cache. In such scenarios, it may be desirable to adapt one or more systems to prevent cache element access without evicting to save resources while preventing the cache element from being modified.

BRIEF DESCRIPTION OF DRAWINGS

Certain embodiments of the disclosure will be described with reference to the accompanying drawings. However, the accompanying drawings illustrate only certain aspects or implementations of the disclosure by way of example and are not meant to limit the scope of the claims.

FIG. 1.1 shows a diagram of a system in accordance with one or more embodiments.

FIG. 1.2 shows a diagram of a node in accordance with one or more embodiments.

FIG. 1.3 shows a diagram of a cache in accordance with one or more embodiments.

FIG. 1.4 shows a diagram of a namespace manager in accordance with one or more embodiments.

FIG. 1.5 shows a diagram of a global hash table in accordance with one or more embodiments.

DETAILED DESCRIPTION

Figure 2:
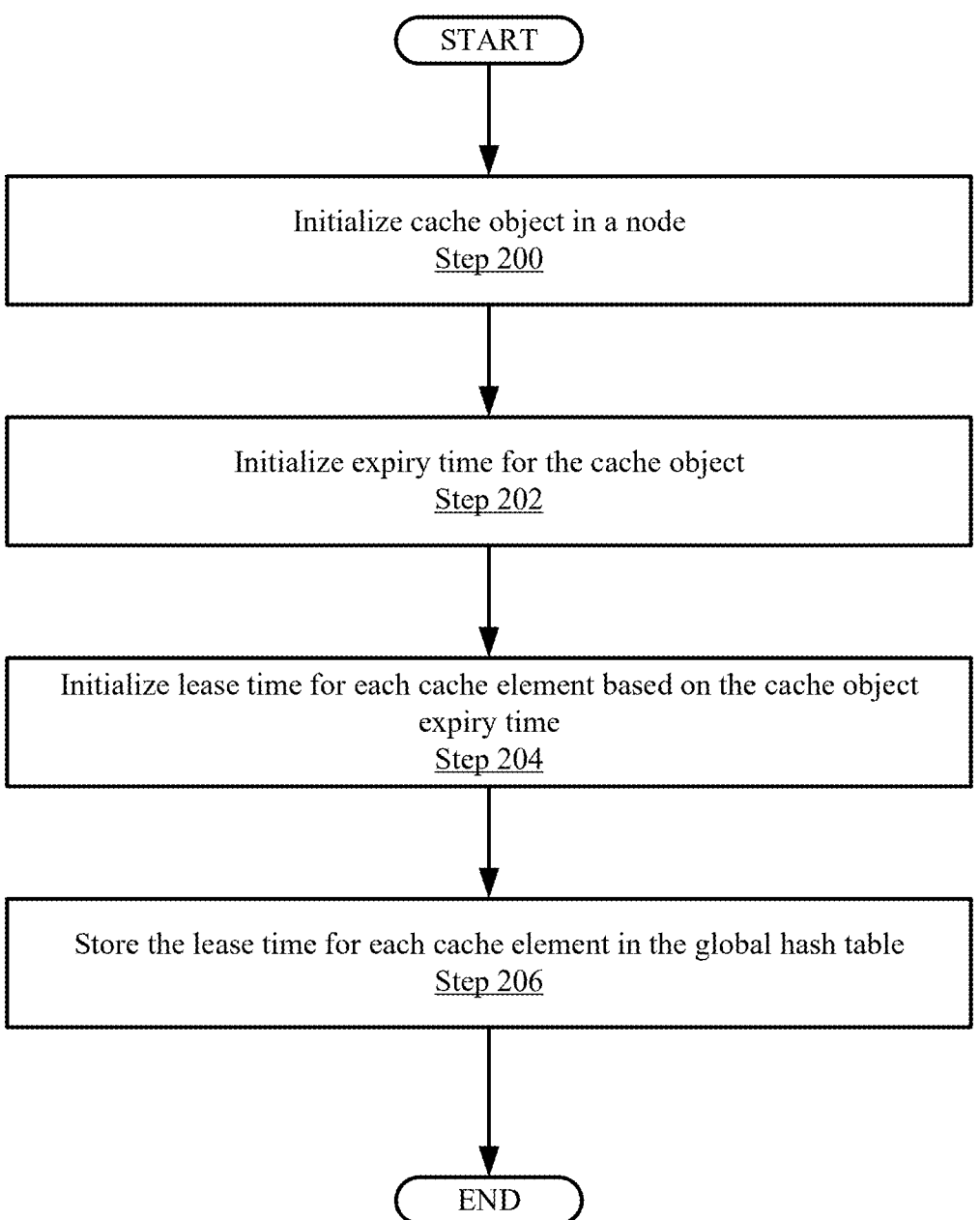
FIG. 2 shows a flowchart for a method for initializing lease time for each cache element in accordance with one or more embodiments.

In single node or multimode file systems, cache is important to maintaining quick and efficient file access. However, because cache has limited storage space, cache can only maintain a portion of the files within the filesystem. Therefore, efficient cache management, namely evicting existing cache elements to make room for new cache elements, is necessary to maintain overall filesystem performance. However, existing cache management solutions can be slow and inefficient. In some circumstances, the filesystem may need to prevent cache element access, e.g., when caching snapshots of the file system, but cannot spare the time or compute resources necessary to individually evict each cache element from the cache. Traditional methods do not include a way to prevent cache element access (e.g., preventing modification, removing filesets, etc.) before the cache element is evicted without individually processing each cache element.

While no solutions/approaches exist for single or multimode filesystems, (for at least the aforementioned issue(s)), some of the existing solutions prevent cache element access by eviction the cache elements based on certain factors. In a traditional approach, the cache element eviction may be based on age, where the oldest cached element is evicted to make space for a new cache element. This method may iterate the cache to identify which cache element is the oldest. However, this approach consumes significant resources, especially in multi-node file systems where the cache elements may exist across multiple nodes.

Furthermore, traditional methods for invalidating cache elements utilize an iterative process where one cache element must be invalidated before moving on to the next cache element. The method traditionally requests exclusive access to a cache element and waits to obtain the exclusive access before invalidating and continuing the process. Accordingly, this approach also consumes significant resources and is inefficient due to the requirement to wait for exclusive access before proceeding to the next cache element.

Accordingly, the above approaches cannot prevent cache element access, by invalidating the cache element, without evicting the cache element or waiting for exclusive access.

For at least the reasons discussed above and without requiring resource-intensive efforts (e.g., time, engineering, etc.), a fundamentally different approach/framework is needed (e.g., an approach for file systems) to prevent cache element access without evicting the cache element. In doing so, the filesystem can prevent cache element access without consuming significant resources.

Specific embodiments will now be described with reference to the accompanying figures.

FIG. 1.1 shows a system in accordance with one or more embodiments. The system (100) may include any number of clients (e.g., client A (110A), client N (110N), etc.) and a distributed storage platform (120). The system may include additional, fewer, and/or different components without departing from the scope described herein. Each component may be operably/operatively connected to any of the other components via any combination of wired and/or wireless connections. Each of these system components is described below.

In one or more embodiments, the client (e.g., 110A, 110N, etc.) and the distributed storage platform (120) may be operatively connected to one another through the network (130) (e.g., a local area network (LAN), a wide area network (WAN) such as the Internet, a mobile network, any other network type, or a combination thereof). The network (130) may be implemented using any combination of wired and/or wireless connections. Further, the network (130) may encompass various interconnected, network-enabled sub-components (or systems) (e.g., switches, routers, gateways, etc.) that may facilitate communications between clients (e.g., 110A, 110N, etc.) and the distributed storage platform (120). Moreover, the client (e.g., 110A, 110N, etc.) and the distributed storage platform (120) may communicate with one another using any combination of wired and/or wireless communication protocols.

In one or more embodiments, the clients (e.g., 110A, 110N, etc.) may be physical or logical computing devices configured for hosting one or more workloads, or for providing a computing environment whereon workloads may be implemented. The clients (e.g., 110A, 110N, etc.) may correspond to computing devices that one or more users use to interact with one or more components of the system (100).

Figure 5:
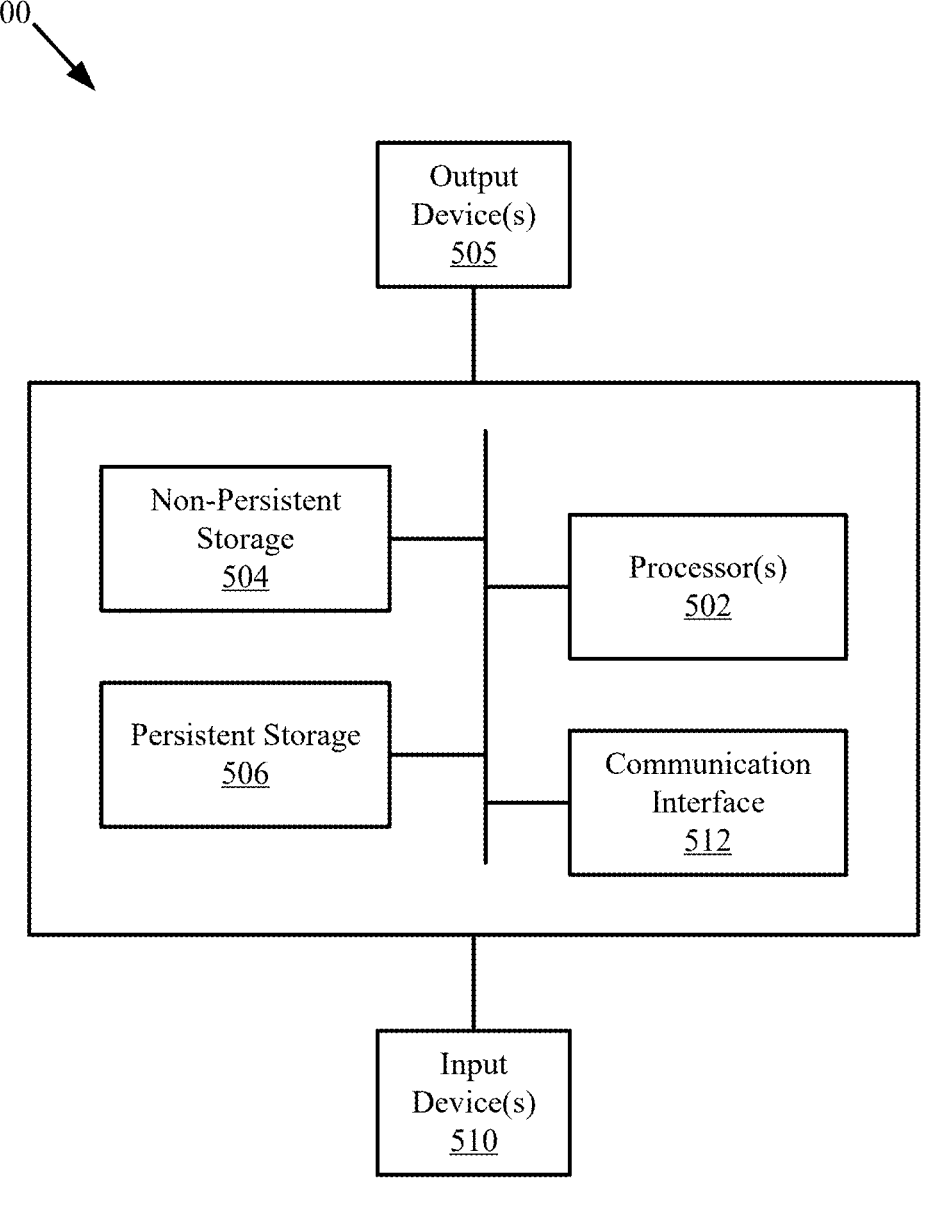
FIG. 5 shows a computing system in accordance with one or more embodiments.

Further, in one or more embodiments, a client (e.g., 110A, 110N, etc.) may be implemented as a computing device (e.g., 500, FIG. 5). The computing device may be, for example, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the client described throughout the application.

In one or more embodiments, the distributed storage platform (120) may be a scale-out storage platform (e.g., a storage cluster) that includes/hosts, at least, a namespace manager (127), discussed further in FIG. 1.4, and any number of nodes (also called storage nodes) (e.g., Node A (122A), Node N (122N), etc.).

In one or more embodiments, a storage node (e.g., 122A, 122N, etc.) may be a computing device that, at least, executes software configured to handle (read and/or write) data in memory and/or physical storage device(s) of the storage node. Data stored to one or more storage device(s) across one or more storage node(s) (e.g., 122A, 122N, etc.) may be logically grouped into one or more storage volume(s) (not shown).

In one or more embodiments, a storage volume may be a logical storage structure that stores data for use by one or more clients (e.g., 110A, 110N, etc.). A storage volume may be allocated (i) across one entire physical storage device, (ii) on a portion of one physical storage device, (iii) across two or more physical storage devices, (iv) across two or more portions of two or more physical storage devices, and/or (v) any combination thereof.

Further, in one or more embodiments, when a storage volume persists across two or more physical storage devices, those storage devices may be located in two or more storage nodes (e.g., 122A, 122N, etc.). Accordingly, a storage volume may provide a logical namespace that acts as a layer of indirection between software utilizing data and the data itself (e.g., software executing on a client (e.g., 110A) and the underlying physical storage devices located across one or more storage nodes (e.g., 122A, 122N, etc.)). Non-limiting examples of a storage volume may include an NVMe namespace, an NFS share, a redundant array of independent disks (RAID) array, etc.

In one or more embodiments, a storage node (e.g., 122A, 122N, etc.) may provide long-term, durable, high read/write throughput data storage/protection with near-infinite scale and low-cost. The storage node may be a fully managed cloud/remote (or local) storage (e.g., pluggable storage, object storage, block storage, file system storage, data stream storage, Web servers, unstructured storage, etc.) that acts as a shared storage/memory resource that is functional to store unstructured and/or structured data. In one or more embodiments, the storage node may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the storage node (e.g., 122A, 122N, etc.) may include a memory device (e.g., a dual in-line memory device), in which data is stored and from which copies of previously stored data are provided. As yet another example, the storage node may include a persistent storage device (e.g., an SSD), in which data is stored and from which copies of previously stored data is provided. As yet another example, the storage node may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Turning now to FIG. 1.2, FIG. 1.2 shows a diagram of a node (130) in accordance with one or more embodiments. The node (130) includes a cache (132). The node (130) may include additional, components without departing from the scope of the disclosure herein. For example, the node (130) may contain container data structures (e.g., B-Trees) used to efficiently identify elements within the cache (132). Each of these components is described below.

In one or more embodiments, the cache (132) includes functionality to temporarily store data used by the system (100). By storing data in this manner, the cache (132) includes functionality to increase the client's (110A, 110N) data retrieval speed. In one or more embodiments, the cache (132) may be implemented as one or more hardware component that stores data. The cache may be implemented using any combination of volatile or non-volatile storage without departing from the technology.

In one or more embodiments, the cache (132) may be a global cache to optimize the efficacy of the cache usage and may include functionality to connect to any number of nodes (e.g., node A (122A), node N (122N), etc.). Further, in one or more embodiments, the cache (132) may include functionality to store filesets (which may be snapshots that correspond to active filesets) stored in different nodes (e.g., node A (122A), node N (122N), etc.). As used herein, in one or more embodiments, filesets may be a collection of files and/or directories grouped together based on a shared characteristic. Any shared characteristic can be used to create a fileset without departing from the scope of the disclosure herein. In this manner, the cache (132) may include functionality to store inodes (representation of files) where each inode is associated with an inode number corresponding to a key. The key is a numerical value mapping to the file and is used to represent the contents within the file. The keys may be stored in a global hash table (see FIG. 1.5). The global hash table will be discussed further in FIG. 1.5.

Turning now to FIG. 1.3, FIG. 1.3 shows a diagram of the cache (132) in accordance with one or more embodiments. The cache (132) includes one or more cache objects (134), which contain one or more cache elements (e.g., cache element A (136A), cache element N (136N), etc.). The cache (132) may include additional, fewer, and/or different components without departing from the scope of the disclosure herein. As a non-limiting example, the cache may include a global hash table (152). Each component is described below.

In one or more embodiments, the cache object (134) is associated with a fileset(s) within the system (100). The cache object (134) contains any number of cache elements (e.g., cache element A (134A), cache element N (134N), etc.) which correspond to files within the fileset. Further, the cache object (134) may map to hash values corresponding to the files in the fileset. In one or more embodiments, each cache object (134) may only be associated with one fileset.

In one or more embodiments, each cache element (e.g., cache element A (136A), cache element N (136N), etc.) corresponds to a file in a fileset. More specifically, each cache element (e.g., cache element A (136A), cache element N (136N), etc.) maps to a hash value generated using the associated file and a pointer to the file in the fileset. As a non-limiting example, cache element A may contain a portion of the data (temporary data) associated with fileset 1 and may also map top hash values of files within a fileset that may be distributed across node 1, node 2, and node 3.

Turning to FIG. 1.4, FIG. 1.4 shows a diagram of a namespace manager (140) in accordance with one or more embodiments. The namespace manager (140) includes a directory manager (142) containing an expiry time table (143), a file manager (144) containing a global hash table (145), and a distributed lock manager (DLM) (146). The namespace manager (140) may include additional, fewer, and/or different components without departing from the scope of the disclosure herein. Each of these components is described below.

In one or more embodiments, a directory manager (142) includes functionality to store the expiry time table (143). The expiry time table (143) includes functionality to limit the time each cache object (134) remains in the cache (132). The expiry time table (143) is a data structure that maintains the expiry times for cache objects. Any method of associating the expiry time table (143) to each cache object may be used without departing from the scope of the disclosure herein. In one or more embodiments, the expiry time table (143) may be located in a submanager (e.g., directory manager) within the namespace manager (140). Additionally, in one or more embodiments, the expiry time table (143) includes functionality to map to a lease time (not shown)

In one or more embodiments, the file manager (144) includes functionality to store a global hash table (144). In one or more embodiments, the global hash table (145) maps hash values for files in the filesets. In one or more embodiments, the global hash table (144) may be a single table containing multiple entries. Further, the global hash table (144) may be located in the namespace manager (140) or may be located in a submanager (e.g., file manager) within the namespace manager (140). The global hash table (144) is discussed further in FIG. 1.5 below.

In one or more embodiments, the DLM (146) includes functionality to update the lease times (discussed further in FIG. 2) in the system (100). The DLM (146) may also include functionality to grant or withhold locks associated with the cache elements. The DLM (146) may be a software component that manages and coordinates lock access across multiple nodes in the system (100). In this manner, the DLM includes functionality to manage access to shared resources (e.g., cache elements in the cache) to prevent conflicts when multiple nodes attempt to access the same cache element (e.g., cache element A (134A), cache element N (134N), etc.) simultaneously. Further, in one or more embodiments, the DLM (146) may include functionality to retrieve shared trylocks (described below) and obtain an exclusive trylock to perform operations on a cache object. During the operation, each cache element within the cache object may have its lease time updated by the DLM. In this manner, the DLM may update lease times for cache elements existing across multiple nodes in clustered or multi-node systems. In one or more embodiments, the DLM (146) may exist within the namespace manager (140) or may exist outside of the namespace manager (140) as a separate system (100) component without departing from the scope of the disclosure herein.

Turning to FIG. 1.5, FIG. 1.5 shows a diagram of a global hash table (152) in accordance with one or more embodiments. The global hash table (152) includes one or more global hash table entries (global hash table entry A (154A), global hash table entry N (154N), etc.). The global hash table may include hash information associated with multiple filesets (e.g., fileset A (150A), fileset N (150N), etc.) without departing from the scope of the disclosure. The global hash table (152) may also include any number of keys associated with cache elements without departing from the scope of the disclosure. The global hash table (152) may include additional, fewer, and/or different components without departing from the scope of the disclosure herein. Each of these components is described below.

In one or more embodiments, each global hash table entry (global hash table entry A (154A), global hash table entry N (154N), etc.) includes functionality to, in conjunction with the namespace manager, identify cache elements in filesets for invalidation. The global hash table entry may be one entry in a list of entries associated with multiple filesets. As a non-limiting example, the global hash table (152) may obtain keys associated with fileset 1, fileset 2, and fileset 3 and sort the keys into individual entries (global hash table entries) where the global hash table entries are associated with individual files within the filesets. Said another way, global hash table entries 1-10 may be entries containing inode numbers and keys representing files 1-10 in fileset 1, global hash table entries 11-20 may be entries containing inode numbers and keys representing files 1-10 in fileset 2, and global hash table entries 21-30 may be entries containing inode numbers and keys representing files 1-10 in fileset 3. Continuing the example, each global hash table entry may include a pointer that points to the cache element associated with the key and inode. For example, global hash table entry 1, containing inodes representing file 1 in fileset 1, also includes a key to cache element 1 (representing file 1 in the cache object (where the cache object is associated with fileset 1)).

Turning to FIG. 2, FIG. 2 shows a flowchart for a method for initializing lease time for each cache element in accordance with one or more embodiments. The method may be performed by, for example, the namespace manager (140). Other components in the system may perform this method without departing from the scope of disclosure herein.

While the various steps in the flowchart shown in FIG. 2 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel. Further, one or more steps in FIG. 2 may be performed concurrently with one or more steps in FIGS. 3-4. Further, the steps in FIG. 2 occur in parallel between each cache object in the cache.

Turning to step 200, in step 200, the namespace manager (140, FIG. 1.4) initializes a cache object (134, FIG. 1.3) in a node (e.g., node A (122A), node N (122N), etc., FIG. 1.1). As used herein, initializing means placing the cache object in the cache (120, FIG. 1.2). The cache may be a local cache for a single node or may be a global cache accessed by a plurality of nodes in the system (100).

In step 202, the namespace manager initializes the expiry time for the cache object. The expiry time is initialized at the same time as the cache object and applies to every cache element (e.g., cache element A (134A), cache element N (134N), etc., FIG. 1.3) within the cache object. In this manner, the namespace manager can assign an expiry time to every cache element without individually associating an expiry time to each cache element, thereby saving significant processing time.

In step 204, the namespace manager initializes the lease time for each cache element based on the cache object expiry time. The lease time is initialized by using a one-to-one mapping of the expiry time to the lease time. Said another way, the expiry time and the lease time contain the same metadata information. Further, the lease time is initialized for each cache element by inheriting the expiry time associated with the cache object, similarly reducing the processing time in the same method used for the expiry time. In step

206, the lease time for each cache element is then stored in the global hash table with a global hash table entry associated with the cache element. In one or more embodiments, the method ends here.

Figure 3:
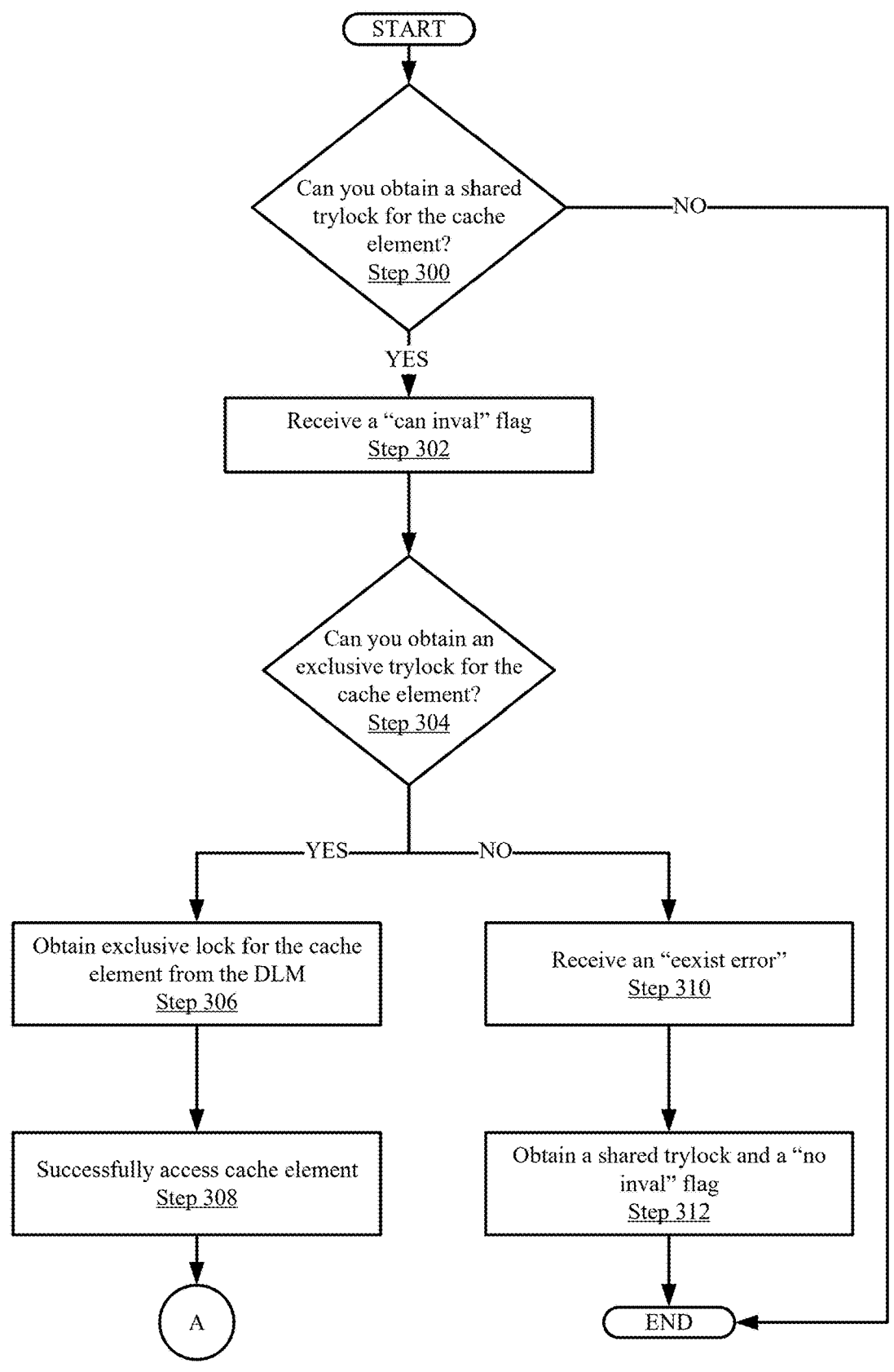
FIG. 3 shows a flowchart for a method for attempting cache element access in accordance with one or more embodiments.

Turning to FIG. 3, FIG. 3 shows a flowchart for a method for attempting cache element access in accordance with one or more embodiments. The method may be performed by, for example, the namespace manager (140). Other components in the system may perform this method without departing from the scope of disclosure herein. Further, the method may be performed in a single node or multimode system without departing from the scope of the disclosure herein.

While the various steps in the flowchart shown in FIG. 3 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel. Further, one or more steps in FIG. 3 may be performed concurrently with one or more steps in FIGS. 2 and 4.

Turning to step 300, in step 300, the namespace manager makes a determination as to whether the namespace manager can obtain a shared trylock for a first cache element identified by the global hash table. As used herein, the shared trylock is a shared access grant to the cache element, where one or more system (100) components (e.g., client A (110A), client N (110N), namespace manager (127)) receive access to the first cache element. The shared trylock may be a lower-level access grant where some functions, particularly delete and modify, are prohibited. In one or more embodiments, if the determination is YES, the namespace manager receives the shared access and the method proceeds to step 302. In one or more embodiments, if the determination is NO, the method ends, and the namespace manager stops attempting access to the first cache element.

In step 302, based on the positive determination in step 300, the namespace manager receives a "can inval" flag associated with the first cache element. As used herein, the phrase "can inval" indicates to the namespace manager that the first cache element may be invalidated but does not actually invalidate the first cache element.

After receiving the "can inval" flag, in step 304 the namespace manager makes a determination as to whether the namespace manager can obtain an exclusive trylock. As used herein, the exclusive trylock is a higher-level grant, on a local node, which permits exclusive access to the first cache element and prevents any other system component from accessing the first cache element while the exclusive lock is granted. The exclusive lock permits higher-level functions such as deletion or modification. In one or more embodiments, if the determination is YES, the method proceeds to step 306. In one or more embodiments, if the determination is NO, the method proceeds to step 310.

In step 306, based on the positive determination in step 304, the namespace manager receives an exclusive access for the first cache element. In step 308, the namespace manager uses the exclusive access to successfully access the first cache element. The method then proceeds to step 402 in FIG. 4 below.

Turning to step 310, based on the negative determination in step 304, the namespace manager receives an error when attempting to access the first cache element without the exclusive access, which indicates that the exclusive trylock was not obtained. Accordingly, in step 312, the namespace manager requests the shared trylock from step 302 with a "no inval" flag associated with the first cache element. This indicates that the first cache element will not be invalidated. In this manner, the method does not indefinitely wait for exclusive access on the first cache element and can either end or proceed with another cache element. Said another way, by implementing the method in FIG. 3, the namespace manager uses a two-level lock approach that allows the namespace manager to: (i) quickly check if it is possible to even obtain an exclusive lock, (ii) if and only if it is possible, then an attempt to obtain the exclusive lock is made, and (iii) if, ultimately, an exclusive lock is not obtained, then the namespace manager includes a mechanism to abort this attempt in a manner that does not result in the namespace manager indefinitely waiting to obtain the exclusive lock. As a result, the namespace manager may efficiently process the cache elements and readily identify cache elements that should be marked for invalidation.

Figure 4:
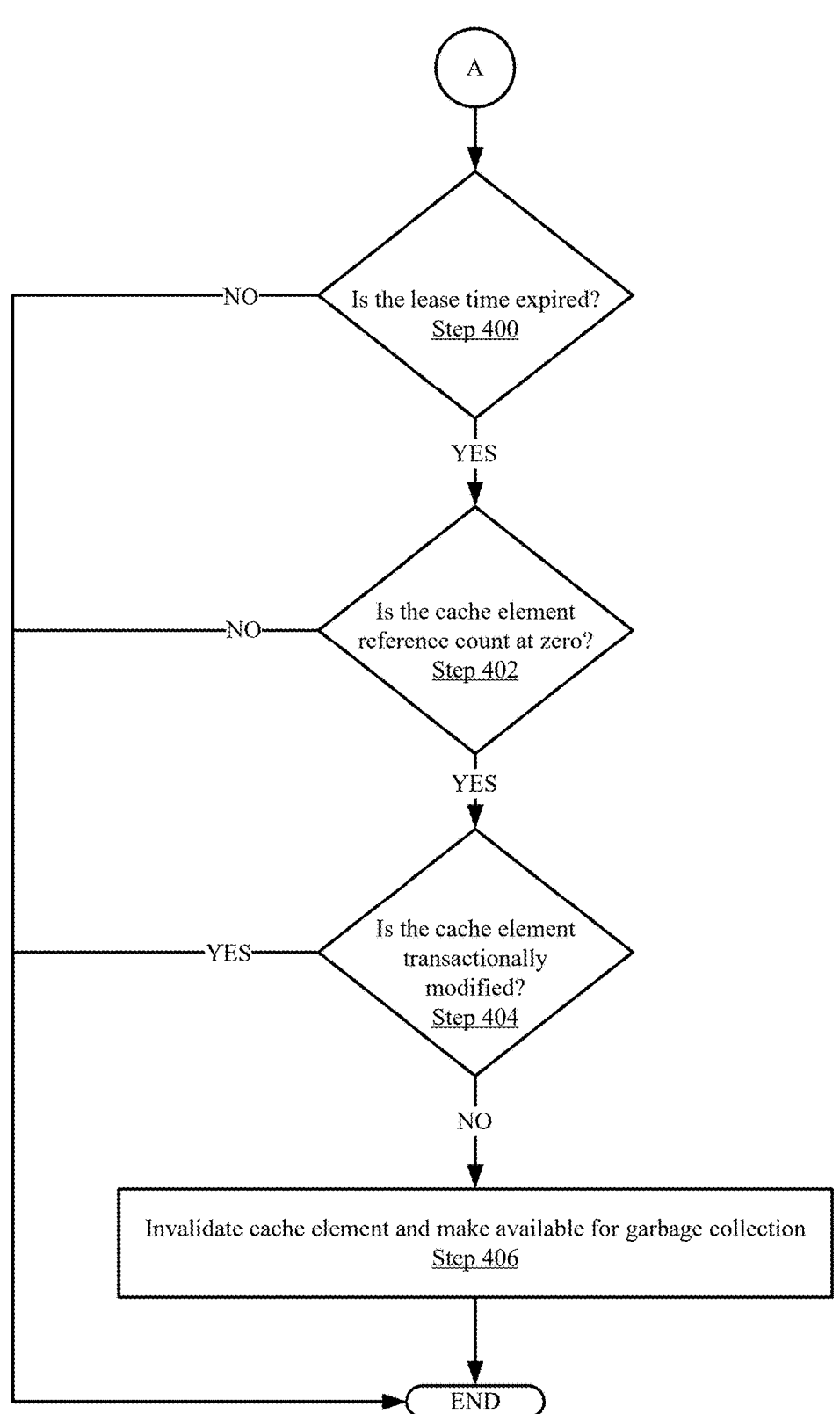
FIG. 4 shows a flowchart for a method for invalidating cache elements in accordance with one or more embodiments.

Turning to FIG. 4, FIG. 4 shows a flowchart for a method for invalidating cache elements in accordance with one or more embodiments. The method may be performed by, for example, the namespace manager (140). Other components in the system may perform this method without departing from the scope of disclosure herein.

While the various steps in the flowchart shown in FIG. 4 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel. Further, one or more steps in FIG. 4 may be performed concurrently with one or more steps in FIGS. 2-3.

FIG. 4 continues the method shown in FIG. 3, starting from step 308. In step 400, the namespace manager makes a determination as to whether the lease time stored in the global hash table entry associated with the first cache element is expired. In one or more embodiments, if the determination is YES, the method proceeds to step 402. In one or more embodiments, if the method is NO, the method ends, and the first cache element is not invalidated.

In step 402, based on the determination that the lease time associated with the first cache element is expired, the namespace manager makes a second determination as to whether the cache element reference count is at zero. As used herein, the reference count indicates how many components in the systems are currently accessing the first cache element.

Continuing with step 402, in one or more embodiments, if the determination is YES, the method proceeds to step 404. In one or more embodiments, if the determination is NO, the method ends, and the first cache element is not invalidated.

Turning to step 404, based on the determination that the reference count associated with the first cache element is zero, the namespace manager makes a third determination to check if the first cache element has been transactionally modified. As used herein, a cache element is transactionally modified if it is logged in a transaction log but not yet persisted at its final location on media. In one or more embodiments, if the determination is NO, the method proceeds to step 405. In one or more embodiments, if the method is YES, the method ends, and the first cache element is not invalidated.

In step 405, the namespace manager makes a fourth determination to check if there are any granted shared or exclusive locks associated with the cache element. Said another way, the namespace manager checks to see if any nodes or entities are currently accessing the cache element. In one or more embodiments, if the determination is YES, the method ends, and the first cache element is not invalidated. In one or more embodiments, if the determination is NO, the method proceeds to step 406.

In step 406, the namespace manager invalidates the first cache element and makes the cache element available for eviction from the cache via a garbage collection algorithm. By invalidating, the namespace manager sets the cache element attributes to zero and requires a refresh of the file inode attributes in the cache element from storage if the files are to be stored in the cache again. Any known or later discovered cache eviction algorithm may be used without departing from the scope of the disclosure herein. As used herein, invalidate means to set the global hash table entry associated with the cache element to 0. This ensures that whenever a system component attempts to access the cache element, the system component receives an error (e.g., stale file handle) and is unable to access the cache element. By doing so, the namespace manager can prevent the cache element from being accessed or modified without requiring eviction of the cache element. In one or more embodiments, the method ends here.

Embodiments of the disclosure may be implemented using computing devices. FIG. 5 shows a diagram of a computing device (500) in accordance with one or more embodiments. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (508) (e.g., Bluetooth interface, infrared interface, network interface, optical interface, etc.), input devices (510), output devices (508), and numerous other elements (not shown) and functionalities. Each of these components is described below.

In one embodiment, the computer processor(s) (502) may be an integrated circuit for processing instructions. For example, the computer processor(s) (502) may be one or more cores or micro-cores of a processor. The computing device (500) may also include one or more input devices (510), such as a touchscreen, keyboard, mouse, microphone, touchpad, electronic pen, or any other type of input device. The communication interface (508) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) (508, 510) may be locally or remotely connected to the computer processor(s) (502), non-persistent storage (504), and persistent storage (506). Many diverse types of computing devices exist, and the aforementioned input and output device(s) (510, 508) may take other forms.

The problems discussed above should be understood as being examples of problems solved by embodiments of the disclosure and the disclosure should not be limited to solving the same/similar problems. The disclosed disclosure is broadly applicable to address a range of problems beyond those discussed herein.

Specific embodiments were described with reference to the accompanying figures. In the above detailed description of the embodiments, numerous specific details are set forth in order to provide a more thorough understanding of one or more embodiments. However, it will be apparent to one of ordinary skill in the art that the one or more embodiments may be practiced without these specific details. In other instances, well-known features have not been described in detail to avoid unnecessarily complicating the description.

In the prior description of the figures, any component described with regard to a figure, in various embodiments, may be equivalent to one or more like-named components described with regard to any other figure. For brevity, descriptions of these components are not repeated with regard to each figure. Thus, each and every embodiment of the components of each figure is incorporated by reference and assumed to be optionally present within every other figure having one or more like-named components. Additionally, in accordance with various embodiments, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for preventing cache element access in a cache, the method comprising:

selecting a cache element represented in a global hash table;

making a first determination that a shared trylock associated with the cache element can be obtained;

based on the first determination, obtaining the shared trylock and receiving a can inval flag;

making a second determination, after receiving the can inval flag, that an exclusive trylock associated with the cache element can be obtained;

based on the second determination, obtaining the exclusive trylock associated with the cache element; and invalidating, after obtaining the exclusive trylock, the cache element.

2. The method of claim 1, wherein the global hash table maps to hash values and comprises pointers associated with a plurality of filesets.

3. The method of claim 2, wherein each fileset in the plurality of filesets comprises a plurality of files.

4. The method of claim 3, wherein each file in the plurality of files is associated with a unique cache element in the cache.

5. The method of claim 1, wherein the shared trylock comprises a lower-level access grant by a Distributed Lock Manager (DLM).

6. The method of claim 5, wherein the exclusive trylock comprises a higher-level access grant by the DLM and revokes any other shared trylocks associated with the cache element.

7. The method of claim 6, wherein the DLM updates a lease time associated with the cache element while granting and revoking exclusive trylocks and shared trylocks.

8. The method of claim 7, wherein the lease time comprises mapping a cache object expiry time to a cache element.

9. A non-transitory computer readable medium comprising computer readable program code, which when executed by a computer processor enables the computer processor to perform a method for preventing cache element access in a cache, the method comprising:

selecting a cache element represented in a global hash table;

making a first determination that a shared trylock associated with the cache element can be obtained;

based on the first determination, obtaining the shared trylock and receiving a can inval flag;

making a second determination, after receiving the can inval flag, that an exclusive trylock associated with the cache element can be obtained;

based on the second determination, obtaining the exclusive trylock associated with the cache element; and invalidating, after obtaining the exclusive trylock, the cache element.

10. The non-transitory computer readable medium of claim 9, wherein the global hash table maps to hash values and comprises pointers associated with a plurality of filesets.

11. The non-transitory computer readable medium of claim 10, wherein each fileset in the plurality of filesets comprises a plurality of files.

12. The non-transitory computer readable medium of claim 11, wherein each file in the plurality of files is associated with a unique cache element.

13. The non-transitory computer readable medium of claim 9, wherein the shared trylock comprises a lower-level access grant by a Distributed Lock Manager (DLM).

14. The non-transitory computer readable medium of claim 13, wherein the exclusive trylock comprises a higher-level access grant by the DLM and revokes any other shared trylocks associated with the cache element.

15. The non-transitory computer readable medium of claim 14, wherein the DLM updates a lease time associated with the cache element while granting and revoking trylocks.

16. The non-transitory computer readable medium of claim 15, wherein the lease time comprises mapping a cache object expiry time to a cache element.

17. A system for preventing cache element access in a cache, the system comprising:

the cache;

a processor comprising circuitry;

memory comprising instructions, which when executed by the processor perform a method, the method comprising:

selecting a cache element represented in a global hash table;

making a first determination that a shared trylock associated with the cache element can be obtained;

based on the first determination, obtaining the shared trylock and receiving a can inval flag;

making a second determination, after receiving the can inval flag, that an exclusive trylock associated with the cache element can be obtained;

based on the second determination, obtaining the exclusive trylock associated with the cache element; and invalidating, after obtaining the exclusive trylock, the cache element.

18. The system of claim 17, wherein the global hash table maps to hash values and comprises pointers associated with a plurality of filesets.

19. The system of claim 18, wherein each fileset in the plurality of filesets comprises a plurality of files.

20. The system of claim 19, wherein each file in the plurality of files is associated with a unique cache element in the cache.

* * * * *